July 29, 1969   R. E. ROBERTS   3,458,611
METHOD OF MAKING SMOOTH BORE REINFORCED HOSE
Filed Dec. 8, 1966   2 Sheets-Sheet 1
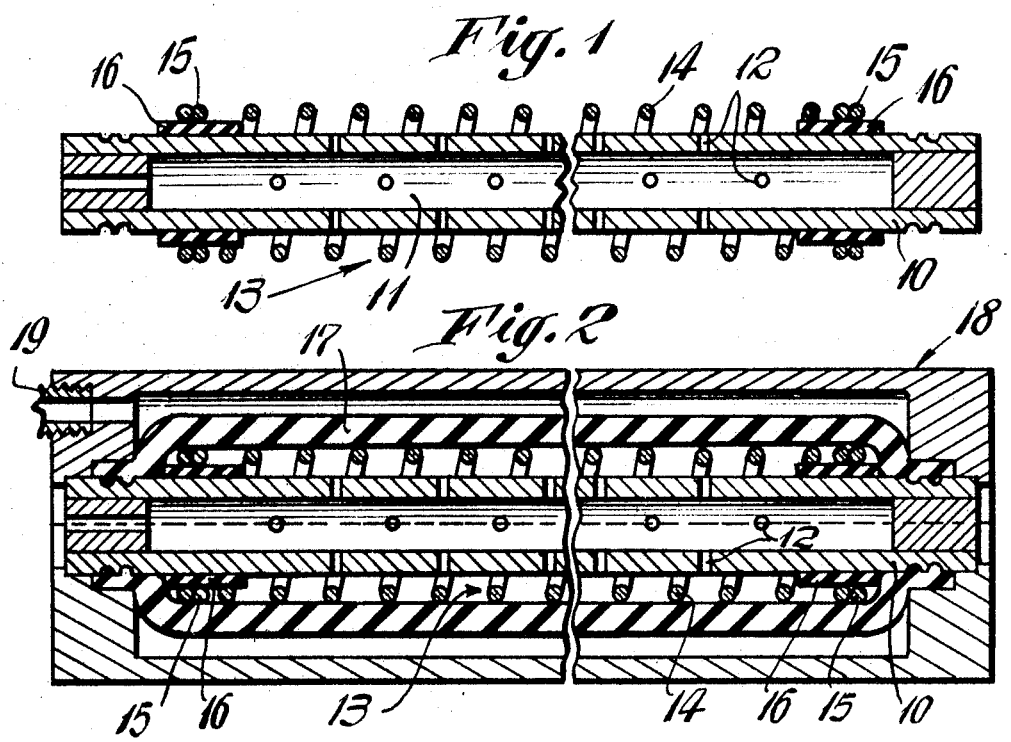
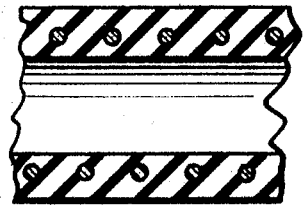
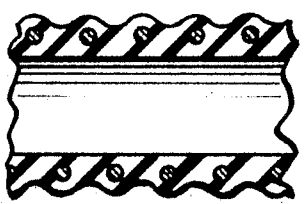
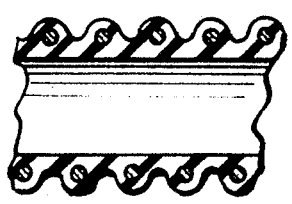
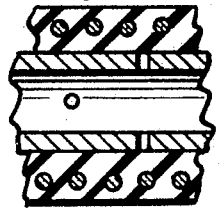
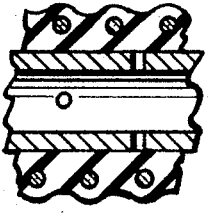
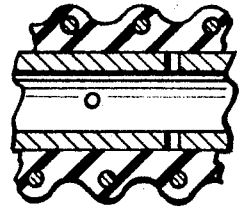
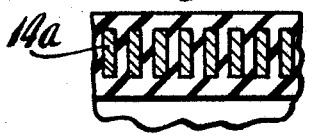
INVENTOR.
Robert E. Roberts
BY Johnson and Kline
ATTORNEYS

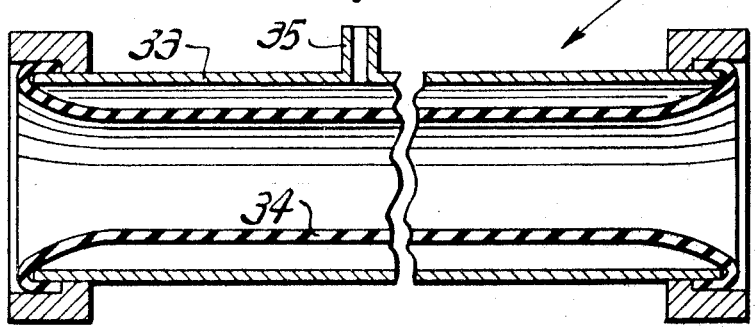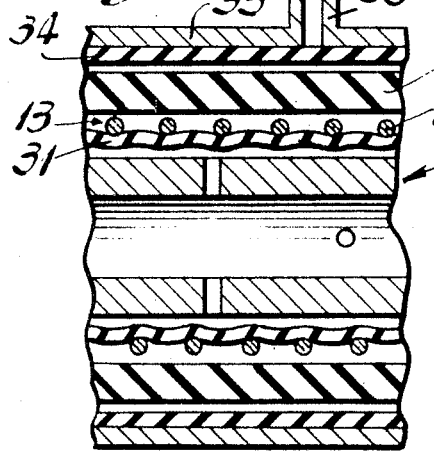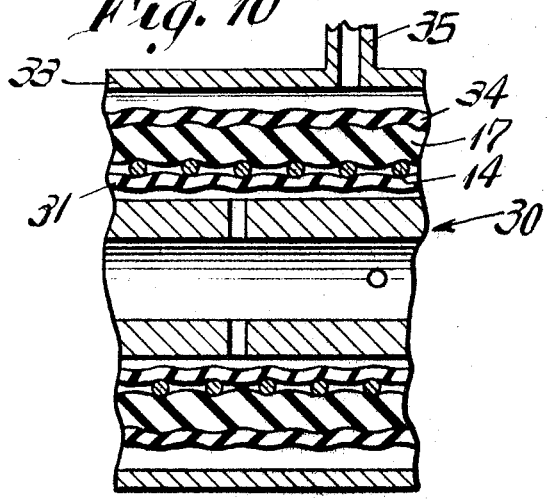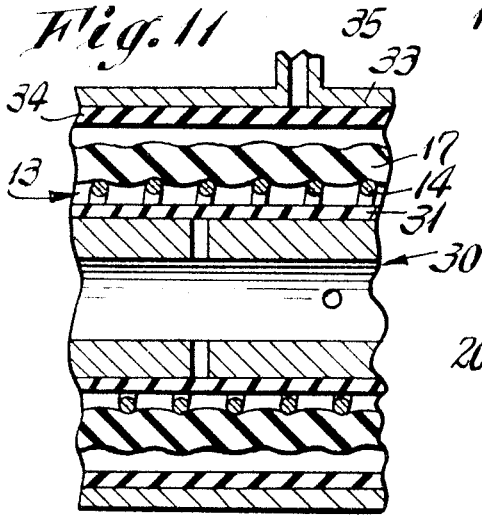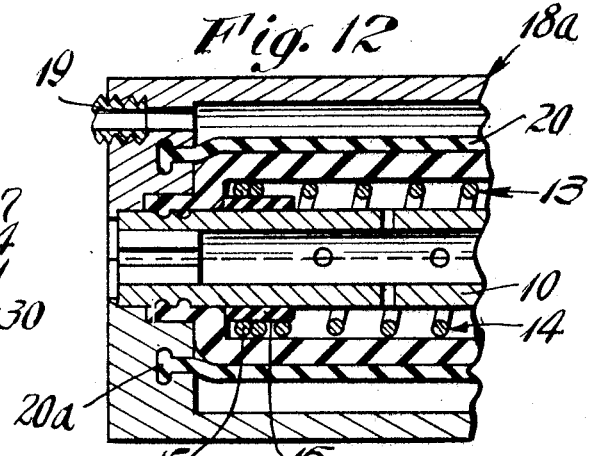

United States Patent Office 3,458,611
Patented July 29, 1969

3,458,611
METHOD OF MAKING SMOOTH BORE REINFORCED HOSE
Robert E. Roberts, Wilton, Conn., assignor to Fred T. Roberts & Company, Wilton, Conn., a corporation of Connecticut
Filed Dec. 8, 1966, Ser. No. 600,246
Int. Cl. B29c *27/18;* B29d *23/00*
U.S. Cl. 264—93    5 Claims

ABSTRACT OF THE DISCLOSURE

A method of forming a smooth bore hose of varying flexibility and having reinforcing coils therein wherein there is employed a mandrel having a smooth cylindrical surface and has inserted thereover reinforcing means having longitudinally spaced coils with the coils in spaced relation to the surface. A sleeve of elastomeric material is positioned around the reinforcing means and heat and/or pressure is applied to the sleeve to cause it to flow inwardly around the coils and against the smooth surface on the mandrel to embed the coils within the hose and form the smooth cylindrical bore in the hose after which the hose is set in its final form.

Heretofore, smooth bore hose have been made by placing a layer of rubber or the like over a mandrel and then building up the hose body on the layer by applying a series of additional layers, which may or may not include reinforcing means, to produce laminations which when secured together produced the hose. This required a number of separate operations which tended to increase the cost of production of the hose and also presented a problem of trapped air between the laminations which could cause a weakness in the wall of the hose.

The present invention provides a simplified method of making a smooth bore, reinforced hose of variable flexibility having longitudinally spaced reinforcing coils embedded therein. The method employs a smooth surfaced mandrel having venting means over which a reinforcing means, preferably longitudinally spaced reinforcing coils, is positioned in spaced relation to said surface. A sleeve of uncured or thermoplastic elastomeric material is positioned to surround the reinforcing means. The elastomeric material of the sleeve flows inwardly under suitable pressure to form a homogeneous molded body which surrounds the coils and is pressed against the surface of the mandrel to produce the embedding of the coils and the smooth bore for the hose. The flexibility of the hose depends upon the selected thickness of the material of the sleeve in relation to the stiffness of the material of the coils, the spacing of the coils with regard to themselves, and the spacing of the coils with respect to the surface of the mandrel.

A feature of the invention resides in the simplicity of the method and the ease by which hose having various flexibility can be produced without altering the steps of the method.

Other features and advantages of the invention will be apparent from the specification and cailms when considered in connection with the accompanying drawings in which:

FIGURE 1 shows a longitudinal view of the mandrel with a reinforcing means in place thereon.

FIG. 2 shows a longitudinal section of the molding means with the mandrel, reinforcing means and sleeve therein prior to the molding operation.

FIGS. 3, 4 and 5 show longitudinal sections of hose having increased flexibility due to decreased thickness of the sleeve with uniform spacing of reinforcing coils.

FIGS. 3A, 4A and 5A are longitudinal sections of hose having increased flexibility due to increased spacing of coils with uniform thickness of the sleeve.

FIGS. 6 and 7 show fragmentary views of different cross-sections of the reinforcing coils.

FIG. 8 is a longitudinal sectional view of a pressure applying means.

FIG. 9 is a fragmentary longitudinal sectional view of the reinforcing means supported by an expansible mandrel within the sleeve and positioned in the pressure applying means.

FIG. 10 is a view similar to FIG. 9 showing the pressure applying means deforming the sleeve into holding relation with the reinforcing means.

FIG. 11 is a view similar to FIG. 10 with the sleeve and reinforcing means secured together and the pressure removed.

FIG. 12 is a view similar to FIG. 2 showing a curing tube in the chamber.

As shown in the drawings the present invention provides a simple method of making a reinforced, smooth-bore hose with a minimum of steps, which hose can be provided with a wide variety of flexibilities as may be required without varying the steps of the method.

In the form of the method illustrated in FIGS. 1 and 2, a smooth surfaced mandrel 10, preferably cylindrical, has a bore 11 therein provided with passages 12 extending to the surface. A reinforcing means 13 illustrated comprises a helically coiled strand 14 of circular cross-section. The strand can be resilient wire or plastic material, such as polypropylene, which would be unaffected by the molding heat.

The reinforcing means is inserted over the mandrel and the ends 15 secured thereto by spacers 16 to the mandrel with the coils predeterminately spaced longitudinally along the mandrel and in spaced relation to the smooth surface thereof as shown in FIG. 1.

A sleeve 17 of uncured or thermoplastic elastomeric material such as is used as body material in the hose art is formed by extrusion or wrapping. While it has an internal diameter which is greater than the outside diameter of the reinforcing means so that it can be readily inserted thereover, it is preferred to have it not greater than 110% of said outside diameter. This sleeve is positioned around the mandrel and reinforcing means and the assembly inserted in a molding chamber 18, as shown in FIG. 2.

With the chamber closed, the ends of the sleeve are clamped between the molding chamber and mandrel as shown in FIG. 2. A fluid pressure medium and/or heat, such as steam, is supplied to the chamber through nipple 19 and surrounds the sleeve. This heat and pressure causes the sleeve to soften and flow inwardly around the coils, embed them in the body and into contact with the smooth surface. There is thereby provided a reinforced homogeneous body having a smooth molded outer surface with a smooth bore of uniform diameter for the hose.

Any air that is trapped between the mandrel and the sleeve will be vented through the passages 12 and bore of the mandrel. If necessary, a slight suction can be placed to insure this air being removed.

The hose thus formed is cured or set in its final form as required by the particular material used.

It has been discovered that, should the reinforcing means sag so that the coils are not uniformly spaced from the surface of the mandrel, when pressure is uniformly applied to the exterior of the sleeve it will cause the reinforcement to become centered about the mandrel and thus be accurately located within the body of the hose when the molding of the body of the hose is complete.

If the hose is to have a relatively heavy body requiring a thick sleeve, it can be placed in a molding and curing chamber 18a, such as shown in FIG. 12, which is similar to the mold of FIG. 2 except that it has a flexible bag 20 having its ends 20a secured therein, as shown, to apply the higher pressure uniformly to the sleeve during molding and to maintain the pressure on the surface of the hose during the curing or setting operation. Also steam can be applied to the bore 11 of the mandrel to aid in softening the sleeve which steam is removed during the molding operation.

The hose of the present invention can be readily made to the desired flexibility without altering the steps of the method. As shown in FIGS. 3, 4 and 5, the hose may be made more flexible by decreasing the thickness of the sleeve. In the hose as shown in FIG. 3 the sleeve of maximum thickness is used and this will produce a stiff, relatively inflexible hose. When the thickness of the sleeve is reduced, the outer surface becomes corrugated as shown in FIG. 4 and a hose more flexible than that of FIG. 3 is provided. In the form of the invention of FIG. 5 a still thinner sleeve is employed. This produces deeper corrugations on the outer surface of the hose and results in increasing the flexibility of the hose. Flexibility can also be attained, as shown in FIGS. 3A–5A wherein the thickness of the sleeve is maintained uniform but the spacing of the coils is altered. In FIG. 3A the coils are spaced longitudinally of the mandrel with a pitch equal to twice the diameter of the reniforcing strand and thus produces a relatively stiff hose. In FIG. 4A the coils are spaced with a pitch three times the diameter of the strand material and it will be noted that the outer surface becomes slightly corrugated. This will be more flexible than the hose of FIG. 3A. In FIG. 5A the coils are spaced with a pitch four times the diameter of the strand and it will be noted that the corrugations on the exterior of the hose are substantially deeper than those of FIG. 4A and that the hose will be more flexible than the hose of FIG. 4A.

The flexibility of the hose can also be controlled by the stiffness of the material of the reinforcing means and by the cross-section of the reinforcements. For example, the stiffer the reinforcing material used the more inflexible will be the hose and when as shown in FIG. 6 the coils 14a of the reinforcing means is of rectangular cross-section or in FIG. 7 the coils 14b of the reinforcing means is of triangular crosssection, it will have a greater stiffness than when made with a circular cross-section. It has been found that the triangular cross-section is highly advantageous in that it promotes the flow of the elastomeric material during the molding operation.

It will be seen, therefore, that by selecting the thickness of the body where variable thickness walls can be utilized or by spacing the coils where the thickness of the wall must be maintained substantially the same or by use of various cross-sections or stiffness in the material in the reinforcement, the desired flexibility in the hose can be readily produced without in any way altering the steps of the method.

In the form of the invention shown in FIGS. 8–11, it is proposed to assemble and secure the reinforcement to the sleeve prior to the insertion of the body over the smooth bore mandrel. This is accomplished by providing a usual expansible mandrel 30 of the type having an inflatable surface such as formed by the rubber cover 31 shown in FIG. 9. The reinforcement 13 is positioned and the mandrel inflated to hold the coils 14 thereof in accurately longitudinal spaced relation. The sleeve 17 of body material is positioned to surround the coils 14 and the assembly is placed in the pressure-applying means 32 shown in FIG. 8. This has a tubular body 33 with a flexible bag 34 therein with its ends secured at the ends of the body, and which bag has a normal shape as shown. The bag is contracted against the walls of the tubular body, as shown in FIG. 9, by applying a vacuum to the nipple 35 and enabling the sleeve and mandrel to be positioned therein. After the inflated mandrel, with the reinforcing means and sleeve surrounding it, is placed in the pressure-applying means, as shown in FIG. 9, the vacuum is removed and the sleeve returns to its normal position as shown in FIG. 8 which applies pressure to the exterior of the sleeve, as shown in FIG. 10, causing it to deform slightly and engage the outer surface of the coils of the reinforcing means, thus holding the coils in position. This method is highly desirable when it is intended to use annular reinforcing coils rather than helical reinforcing coils since they can be accurately located on the mandrel before assembly with the sleeve 17.

After the sleeve 17 has been distorted into holding relation with the coils 14 pressure is removed from the inflatable mandrel and suction is applied to the pressure-applying means and the assembled spring and sleeve are removed from the pressure-applying means.

The assembly is then inserted over the smooth bore mandrel 10 and positioned in the molding means and pressure is applied to the exterior of the sleeve 17 as described in connection with the form of FIG. 1 to cause thee sleeeve material to flow around the reinforcing means and into engagement with the smooth bore on the mandrel to embed the reinforcement therein and form the smooth bore for the hose.

The present method can be used to make a long hose unit which may be severed into short lengths as desired or may be used to make individual hose units as required and may have fabric reinforcement in the sleeve 17 if necessary.

Variations and modifications may be made within the scope of the claims and portions of the improvements may be used without others.

I claim:

1. The method of making a reinforced smooth-bore hose on a smooth surfaced mandrel comprising the steps of inserting over the mandrel a reinforcing means comprising a plurality of reinforcing coils in predetermined longitudinal spaced relation and in spaced relation with said smooth surface and a sleeve of elastomeric material flowable under heat and pressure and of predetermined thickness to form the body of the hose surrounding said spaced coils, the flexibility of the hose depending upon the thickness of the sleeve, the location of the coils with respect to one another, and to the smooth surface of the mandrel and the stiffness of the material of the coils, placing the mandrel and assembled reinforcing means and sleeve in a molding chamber, applying a fluid pressure to the exterior of the sleeve to produce an inward radial force on the sleeve so as to cause the material of the sleeve to move inwardly and under the spaced coils to embed the coils threin and to engage the surface of the mandrel throughout the length thereof to form the smooth bore for the hose, and setting the hose as so formed.

2. The method as defined in claim 1 wherein the reinforcing coils are connected to form a helix and are inserted over the mandrel and have the ends secured thereto prior to being surrounded by said sleeve of elastomeric material.

3. The method as defined in claim 1 wherein the reinforcing coils are separate coils and are assembled within the sleeve in predetermined relation prior to insertion over the mandrel by having the coils temporarily supported by an expansible support and the sleeve positioned thereover and forced inwardly into gripping relation with said coils.

4. The method as defined in claim 1 wherein heat is applied to both the exterior and interior of the sleeve to soften the elastomeric material to enable the material hereof to readily flow around the coils when the pressure is applied thereto.

5. The method as defined in claim 1 wherein the fluid pressure is applied to a flexible bag surrounding the sleeve to distribute the inward pressure evenly over the sleeve.

References Cited

UNITED STATES PATENTS 2,446,281  8/1948  Harding.
2,766,806  10/1956 Rothermel.
2,782,803  2/1957  Rothermel.
2,903,744  9/1959  Harrison.
3,126,592  3/1964  Taccone.
3,194,705  7/1965  Caplan _____ 264—89

ROBERT F. WHITE, Primary Examiner
ALLEN M. SOKAL, Assistant Examiner

U.S. Cl. X.R.

264—89, 277, 314, 275